United States Patent [19]
Mast

[11] Patent Number: 6,123,207
[45] Date of Patent: Sep. 26, 2000

[54] COLLAPSIBLE SHIPPING AND DISPLAY RACK

[75] Inventor: Richard Mast, Comstock Park, Mich.

[73] Assignee: Glass Corner Greenhouse, Inc., Grand Rapids, Mich.

[21] Appl. No.: 09/261,404

[22] Filed: Mar. 3, 1999

Related U.S. Application Data

[60] Provisional application No. 60/087,319, May 29, 1998.

[51] Int. Cl.$^7$ .................................................... A47F 5/08
[52] U.S. Cl. ............................................................. 211/149
[58] Field of Search ................................... 211/149, 201, 211/150, 130.1, 37, 132.1

[56] References Cited

U.S. PATENT DOCUMENTS

| | | | |
|---|---|---|---|
| 1,167,550 | 1/1916 | Forsyth | 211/149 |
| 1,198,431 | 9/1916 | Forsyth | 211/149 |
| 1,304,847 | 5/1919 | Blais et al. | 211/149 |
| 2,938,632 | 5/1960 | Mondineu | 211/149 |
| 3,093,247 | 6/1963 | Erickson | 211/149 |

*Primary Examiner*—Alvin Chin-Shue
*Assistant Examiner*—Sarah Purol
*Attorney, Agent, or Firm*—Warner Norcross & Judd LLP

[57] ABSTRACT

A shipping rack easily convertible to an extended mode for storing and shipping product, a display mode for displaying product, and a collapsed mode for storing the rack itself. The rack includes a pair of central support columns and a pair of outer posts on either side of the columns. A plurality of shelves are pivotally mounted between the posts and columns. In the extended mode, the shelves are horizontal. As the columns are raised with respect to the posts, the shelves pivot to the desired inclination. Once the shelves are essentially vertical and the posts are drawn close to the central columns, the rack is in the collapsed mode. The rack can be secured in any mode by a strut. A spring counterbalance system installed within one of the central columns assists the mode conversion of the rack.

14 Claims, 4 Drawing Sheets

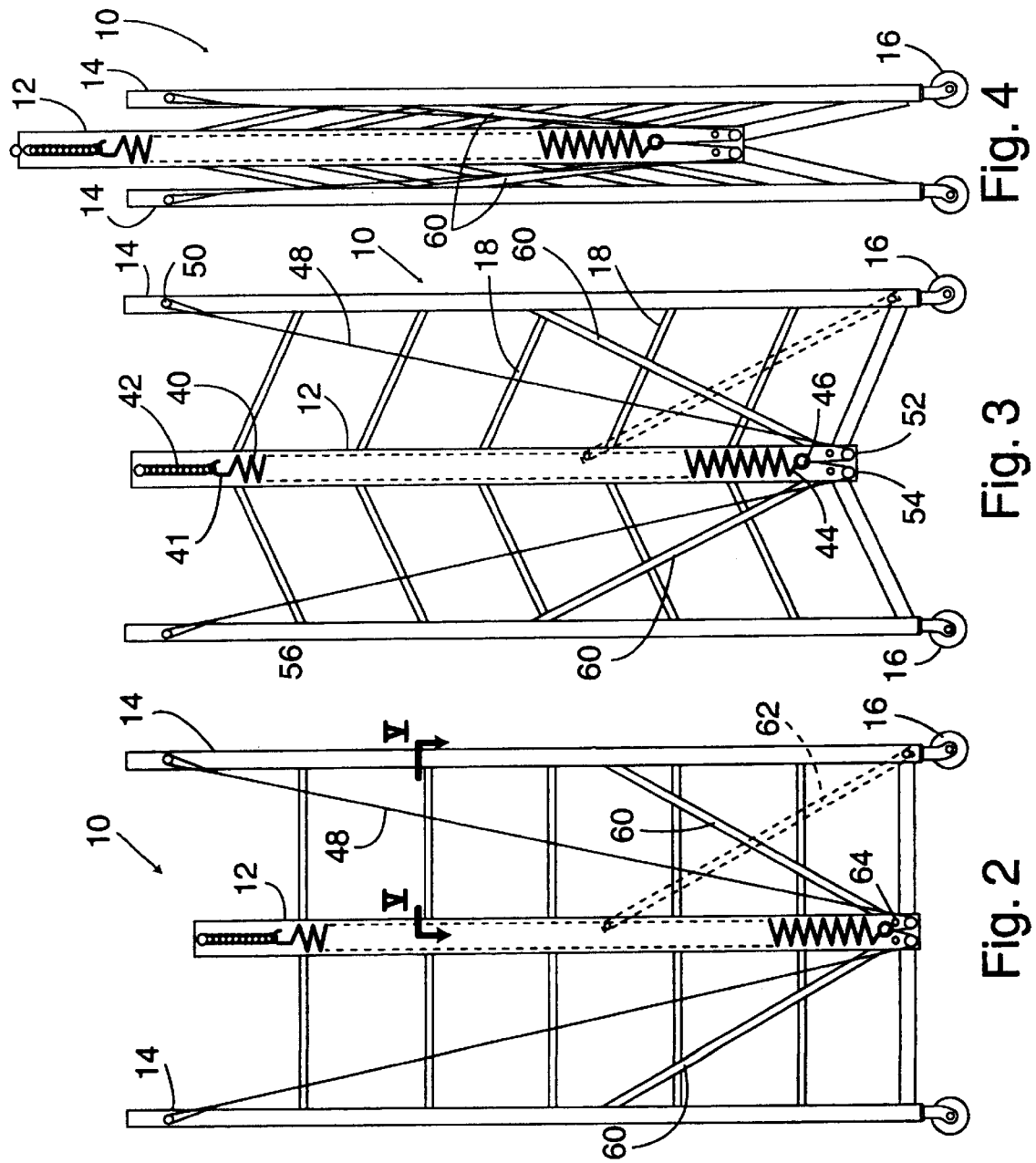

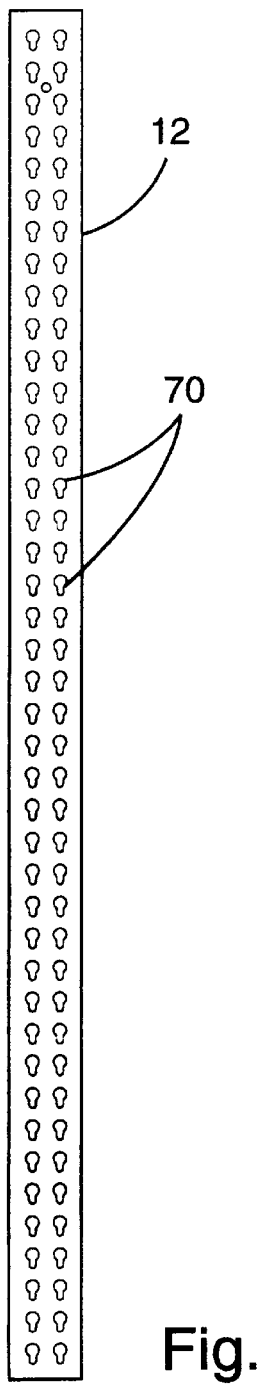
Fig. 7
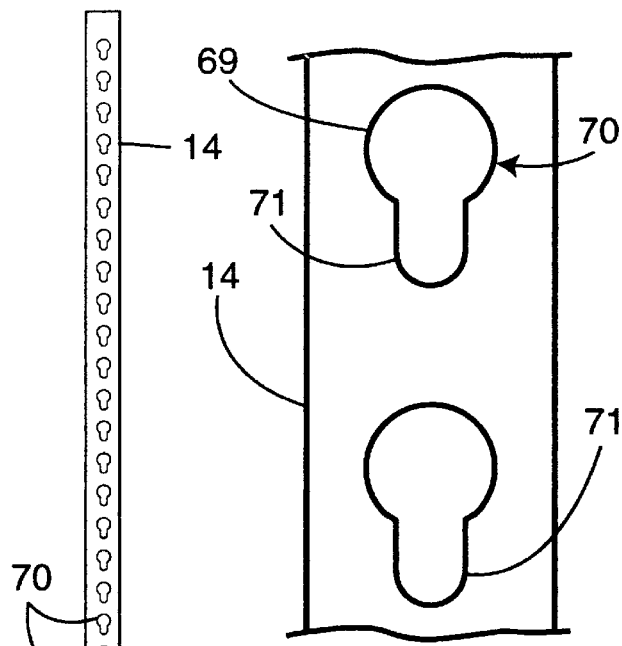
Fig. 9
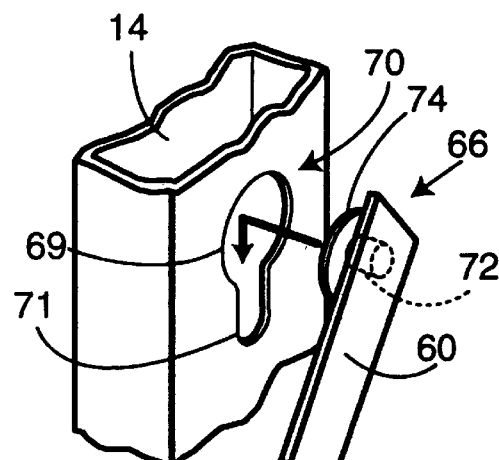
Fig. 10
Fig. 8

COLLAPSIBLE SHIPPING AND DISPLAY RACK

This application claims priority from U.S. Provisional Patent Application Ser. No. 60/087,319 filed May 29, 1998 entitled "Collapsible Shipping and Display Rack," which is incorporated herein in its entirety by reference.

BACKGROUND OF THE INVENTION

The present invention relates to storage racks, and more particularly to collapsible storage racks.

In a number of industries, products are shipped on wheeled racks from the manufacturer to a retailer or distributor. The wheeled racks have a frame mounted on wheels and a number of shelves mounted to the frame. The racks are loaded with products, rolled into a truck, and shipped to the destination. At the destination, the racks are rolled off the truck so that the product can be unloaded from the racks to a separate display or can be displayed and sold directly from the racks in the store. The racks are then collected by the manufacturer for reuse, usually in the same truck that brought the racks to the destination. One particular application of wheeled racks as described above is in the distribution and sale of greenhouse industry plants.

Wheeled racks can be designed to collapse or fold once the rack has been emptied. This allows the user to store the empty rack in a smaller space, which also allows more space in the truck during return shipments. There are numerous types of collapsible racks. See, for example, U.S. Pat. No. 5,131,547 issued Jul. 21, 1992 to Goldberg entitled "Collapsible Storage Rack." However, existing collapsible rack designs can require substantial disassembly of the racks or tedious and strenuous effort to collapse the rack. At least one type of collapsible rack can be folded together in parallelogram fashion; however, it is expensive and requires a special type of shelf consisting of parallel rods, which limit the usefulness of the shelves.

SUMMARY OF THE INVENTION

The aforementioned problems are overcome in the present invention wherein a rack is convertible between an extended mode having shelves generally horizontal and a collapsed mode having the shelves generally vertical. More specifically, the rack includes two pairs of vertical posts defining the four corners of the rack. Two opposing central columns are located about equidistance between the two pairs of posts. Rectangularly-shaped shelves are pivotally mounted between each pair of the posts and the columns so that as the center columns are raised with respect to the posts, the shelves can pivot with respect to the columns and posts. At least one strut is adjustably mounted between one post and column so that the rack can be locked in a desired mode.

In a preferred embodiment, the rack includes a counterbalance system for assisting the conversion of the rack from one mode to another. The system may include a spring mounted within at least one of the center columns and a pulley mounted near the bottom of the column. A cable has one end attached to the post and the other end attached to the spring. The cable is threaded around the pulley so that the portion of the cable between the pulley and the spring is substantially vertical. The spring can be tensioned to provide an upward force on the center column to at least counterbalance the downward load on the columns when the rack is empty and in the extended mode having the struts disengaged.

The collapsible rack of the present invention provides several advantages. It can be easily converted to a collapsed mode by one individual without having to remove the shelves or otherwise dismantle the rack. This is an important advantage, since a trucker that collects the empty racks generally works alone and thus does not have someone readily available to help collapse the racks. The trucker can easily move the rack by rolling it on the wheels, for example, to load the empty rack on a truck. The trucker can then collapse the rack to save significant space during the return shipment. Although the rack is collapsible, the rack is sturdy enough for a user to lift the rack by forklift.

The inventive rack can be easily converted to a display mode that enhances product display without having to dismantle or unload the shelves. Consumers can see and select the displayed products directly from the rack shelves. Once the rack is empty, store personnel can easily roll the rack away and collapse it for compact storage until the rack is collected for return shipment. The shelves are also easily height adjustable to numerous preselected heights to accommodate varying sizes of displayed products. Yet the shelves are secure once installed at the desired height and do not need to be removed to convert the rack from extended to collapsed modes.

These and other objects, advantages, and features of the invention will be more readily understood and appreciated by reference to the detailed description of the preferred embodiment and the drawings.

BRIEF DESCRIPTION OF THE DRAWINGS

FIG. 2 is a fragmentary side view showing the rack and the spring counterbalance system in the extended mode;

FIG. 3 is a fragmentary side view showing the rack and the spring counterbalance system in the display mode;

FIG. 4 is a side view showing the rack and the spring counterbalance system in the collapsed mode;

FIG. 7 is a side view of a center column of the present invention;

FIG. 8 is a side view of a post of the present invention;

FIG. 9 is an exploded fragmentary view showing the keyhole slots employed in the columns and posts of the present invention; and FIG. 10 is a fragmentary perspective view showing the manner in which the strut latches to a post of the present invention.

DETAILED DESCRIPTION OF THE PREFERRED EMBODIMENT

Figure 1:
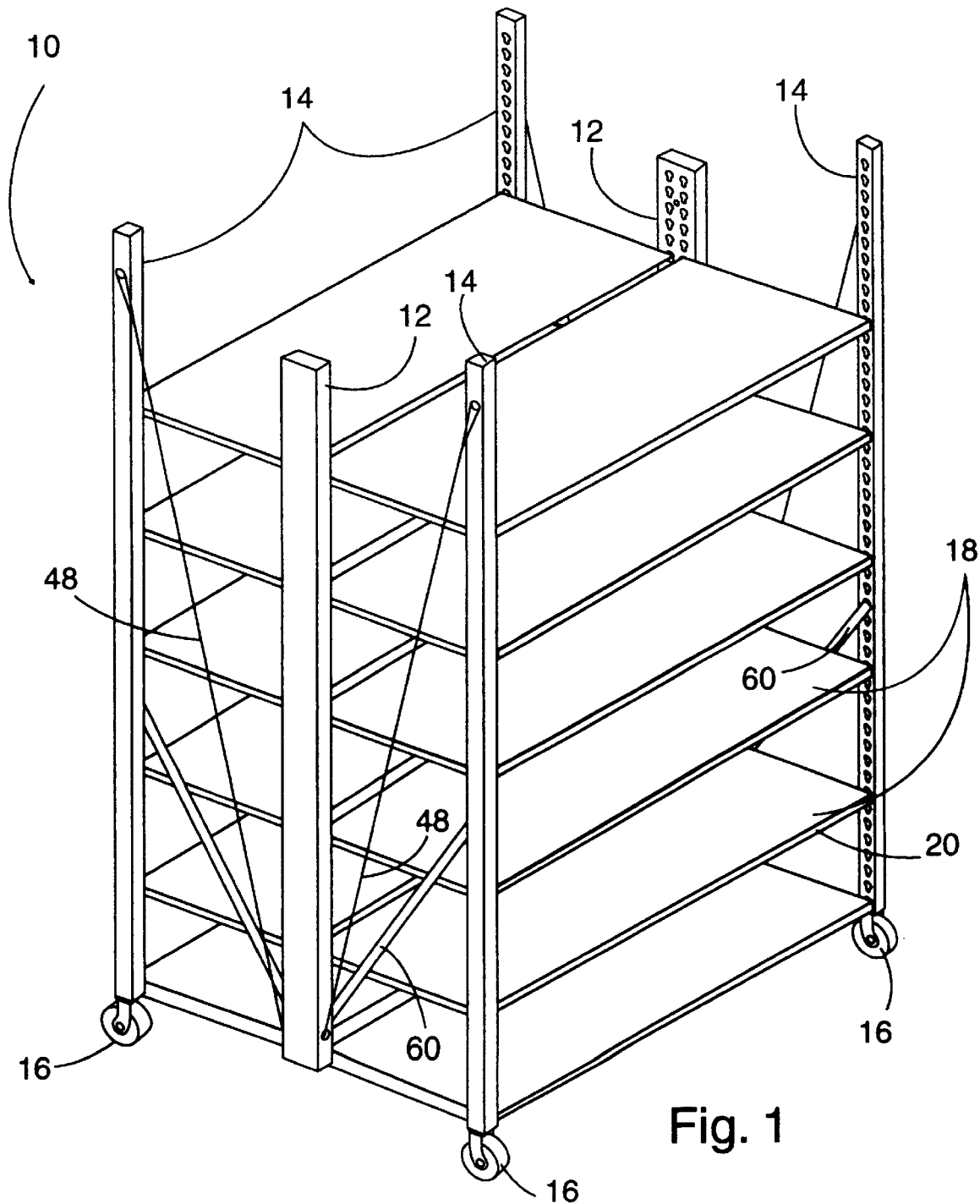
FIG. 1 is a perspective view of the rack of the present invention, shown in the extended mode.

The collapsible shipping and display rack 10 includes center support columns 12 and outer posts 14 to support shelves 18. (FIG. 1.) Raising the center columns draws the posts inwardly and pivots the shelves. In doing so, the rack is collapsible from an extended mode (FIG. 2) to a display mode (FIG. 3), and further to a collapsed mode (FIG. 4). Strut 60 can lock the rack in each of these modes. Spring 40 counterbalances the load on the center column to assist in raising the column.

Rack 10 includes a pair of center support columns 12 and a pair of outer posts 14 on each side of center columns 12.

(FIG. 1.) Posts 14 support the rack at the corners. Posts 14 and columns 12 include a plurality of apertures 70 spaced in a row along the length of the posts and columns, with the columns having a double row of apertures. In the embodiment shown in the drawings, apertures 70 are key-shaped slots each having an upper enlarged portion 69 and a narrow lower neck portion 71. (FIGS. 7–9.) The columns and posts may be tubular construction for strength and weight advantages, fabricated from any material suitable to support the rack load requirements. The columns 12 can be connected to each other by cross members (not shown) to provide additional stability and support.

Casters or wheels 16 may be mounted to the bottom end of the posts 14 so that the rack can be easily moved by pushing it. (FIG. 1.) The wheels 16 can be swivel casters or the wheels on one side of the rack can be fixed in order to provide improved directional control for the rack. In either case the wheels 16 are rotatably mounted to post 14 so that the wheels can roll. A braking or locking mechanism (not shown) can be used to assure that the wheels do not allow movement when the rack is parked, as is known in the art.

Figure 5:
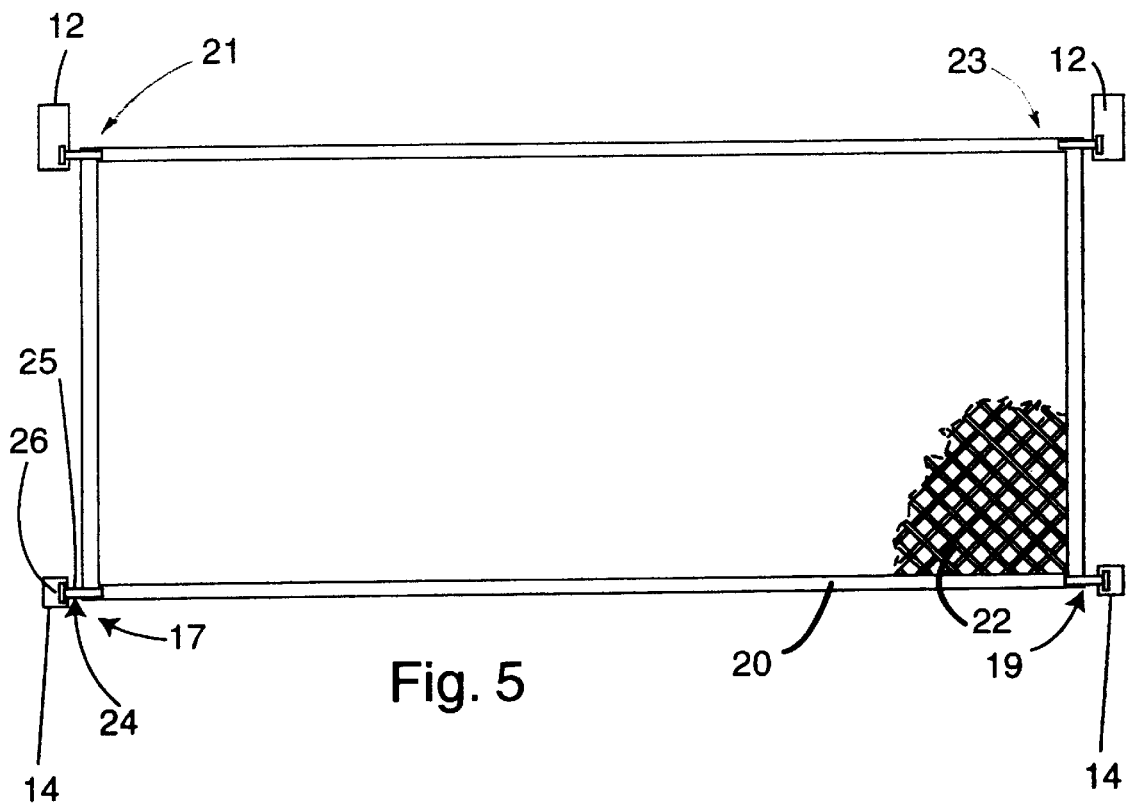
FIG. 5 is a sectional top view of a shelf unit of the present invention taken along line V—V of FIG. 2.

The rack 10 includes a plurality of shelves 18. In the embodiment shown in the drawings, shelves 18 are rectangularly-shaped rigid members having a frame 20 and a suitable support platform 22 mounted on the frame. (FIG. 5.) The support platform 22 may be a sheet metal grid or mesh material so that the support platform is light and strong, permitting dirt and debris to fall through the platforms. Each shelf 18 has front left and right corners 17, 19 and rear left and right corners 21, 23. To support each shelve in the rack, the front corners 17 and 19 of each shelf are each removably and pivotally mounted to a post 14 and the rear corners 21 and 23 are each removably and pivotally mounted to a column 12. The shelves can be constructed of any materials suitable for the expected load and wear conditions, for example, metal or reinforced plastic composites.

Shelves 18 include means for pivotally and removably mounting or suspending the shelves from columns 12 and posts 14. One such means is provided by the cooperation of shelf studs 24 with apertures 70. Stud 24 extends horizontally and laterally from frame 20 at each corner. (FIG. 5.) Stud 24 includes shank 25 extending outwardly from the end of the frame and terminating in enlarged head 26. Head 26 is sized to fit through aperture 70 of post 14 or column 12. In the installed position (FIG. 5), shanks 25 support the load on shelve 18 by resting on the lower edge of apertures 70. Heads 26 prevent the studs 24 from falling out of the apertures. If aperture 70 is a key-hole slot (FIG. 9), the shank 25 fits downwardly into neck 71, with the head 26 nested behind the slot.

Figure 6:
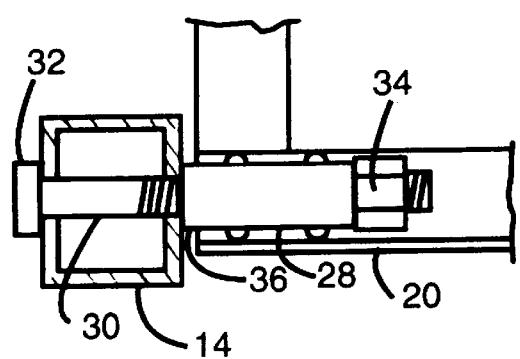
FIG. 6 is a fragmentary view showing an alternative embodiment of the shelf mounting system.

Another means for pivotally mounting the shelves 18 to the columns and posts includes a sleeve 28 fastened by welding or the like to frame 20 and extending outwardly from the ends of the frame. (FIG. 6.) A bolt 30 having a head 32 extends through apertures 70 in column 12 or post 14, through sleeve 28, and out the other end. Nut 34 threads on the outer end of the bolt to hold it in place. The nut 34 can be attached to the end of the sleeve. The portion 36 of sleeve 28 that extends beyond the frame serves as a spacer to space the frame away from the column or post.

Rack 10 includes means for locking the rack in the extended mode (FIGS. 1–2), a display mode (FIG. 3), and a collapsed mode (FIG. 4). The locking means may also support column 12 in a desired position. In the embodiment shown in the drawings, columns 12 are supported by struts 60. Each strut 60 is an elongated bar, chain, or cable extending from column 12 to post 14 and capable of supporting the load of columns 12 when the strut is in tension. (FIG. 1.) If the strut is installed to support the column load in compression (as shown by the phantom line configuration 62 of FIGS. 2–3), then the strut is an elongated bar or other structural member capable of handling the compressive load.

It is possible to use as few as one strut 60 as locking means or to support the columns 12 in the desired position. In a preferred embodiment, the rack 10 includes four struts 60, as shown in the drawings.

Strut 60 may be pivotally mounted at the lower end of column 12 by screw or bolt 64 or the like. The other end of strut 60 is removably and pivotally mounted to post 14 by clip 66, which is capable of clipping or fitting into one of the plurality of apertures 70 in post 14. (FIG. 10.) Clip 66 includes a shaft 72 that terminate in head 74, which is capable of passing through aperture 70. If aperture 70 is a key-hole slot, the shaft 72 fits downwardly into neck 71, with the head 74 nested behind the slot. Clip 66 has a similar structure and function as stud 24 described above in conjunction with the support of shelves 18.

The rack may include counterbalance means sufficient to at least counterbalance the downward load on columns 12 when the shelves are empty, the rack is in the extended mode, and the locking means or strut 60 is disengaged. In the embodiment shown in the drawings, the counterbalance means includes a long coil spring 40 positioned within tubular column 12, the spring having a base end 41 and a free end 44. (FIGS. 2–3.) Base end 41 is mounted or secured to the upper portion of column 12, for example, by attaching chain 42 to both the column 12 and base end 41. The spring free end 44 terminates with eyelet 46. First and second pulleys 52, 54 are rotatably mounted near the bottom of column 12.

Cable 48 is attached at a first end 50 to an upper portion of post 14 and at the second end 56 to another post 14. The cable extends around first pulley 52 upwardly through eyelet 46 of spring 40, and downwardly around second pulley 54. The portions of the cable 48 between the pulleys 52 and 54 and eyelet 46 are substantially vertical, so that the spring and pulleys cooperate to provide an upward force on column 12.

It is possible to use as few as one counterbalance means, for example, one spring 40 mounted within column 12. In a preferred embodiment, the rack 10 includes counterbalance means attached to each column 12, for example, springs 40 mounted within both columns 12.

Alternatively, cable 48 can be attached at one end 50 to an upper portion of post 14 and at the other end to free end 44 of spring 40. The cable extends around pulley 52 and upwardly to attach to free end 44. As before, the portion of the cable between pulley 52 and free end 44 is substantially vertical, so that the spring and pulley cooperate to provide an upward force on column 12.

Other means for counterbalancing include a crank and reel system (not shown), which is capable of hand cranking cable 48 for collection on a reel to provide the upward lift on cable 48 to support columns 12 when strut 60 is disengaged.

Operation of the Collapsible Rack

A user installs the shelves 18 at desired positions on columns 12 and posts 14 by inserting the heads 26 of studs 24 into selected apertures 70 and allowing the weight of the shelf 20 to keep the shanks 25 onto the edges of apertures 70. Head 26 prevents the stud 24 from falling out of aperture 70 so that the shelf remains in position. To move an installed shelf to another desired level, the user simply lifts the shelf to facilitate withdrawing the stud heads 26 from the apertures 70 and removes the shelf, installing it at the newly desired height in the manner previously discussed. The plurality of apertures along columns 12 and posts 14 allows the shelves to be installed at numerous height levels.

The tension on spring 40 can be adjusted to a desired level by stretching the spring to attach the base end 41 of the spring at a suitable height along chain 42 while the rack is unloaded and strut 60 is disengaged. Preferably, spring 40 is tensioned to exert a resilient upward force on cable 48 to at least counterbalance the load on columns 12 when the rack is empty, and more preferably to urge center support column 12 upwardly with respect to the posts 14. The spring 40 can be adjusted to provide a strong lifting force, so that columns 12 automatically lift to place the rack in the collapsed mode if the shelves are empty and strut 60 or other locking means is disengaged.

The rack is placed in the extended mode (FIGS. 1–2) by lowering columns 12 until the shelves 18 are generally horizontal to the ground. In doing so, the shelves 18 pivot about the axis of the studs 24 or bolts 30 installed in apertures 70. Once the shelves are at the horizontal position, the clip 66 of strut 60 is inserted into the corresponding aperture 70 to lock the strut and rack in the extended mode. (FIGS. 1–2, 10.) Product, such as flats of plants from a greenhouse (not shown), can then be placed on the shelves 18 of the rack in the extended mode for transport or storage.

The rack can be converted to the display mode (FIG. 3) by raising column 12 slightly so that strut 60 can also be raised slightly to allow clip 66 to be removed from the corresponding aperture 70. Once the strut 60 or other locking means is disengaged, the user raises column 12 further so that the studs 24 extending from the rear portion of the shelves 18 pivot in columns 12 and the posts 14 are drawn closer to the columns 12—which also allows the rear portion of the shelves to raise with respect to the posts 14 and the front portion of the shelves. Once the shelves have obtained the desired incline, the strut is re-engaged or locked by inserting clip 66 of strut 60 in the corresponding aperture 70, as described above. In this manner, the rack can be converted to the display mode without removing product from the rack. The inclined shelf orientation of the rack display mode enhances the visibility of the product stored on the shelves.

After the displayed product is removed from the rack, it can be converted to the compact, collapsed mode (FIG. 4)—again by raising column 12 slightly so that strut 60 can also be raised slightly to allow clip 66 to be removed from the corresponding aperture 70. Once the strut 60 is disengaged, the user raises column 12 to its maximum height to draw the posts 14 to close proximity to the center columns. At the same time, the studs 24 extending from the the shelves 18 pivot within the apertures in columns 12 and posts 14 until the shelves are substantially vertical (i.e., having each rear shelf portion elevated substantially above the corresponding front shelf portion). The upward force provided by spring 40 assists the user in lifting the center support column upwardly with respect to the posts 14. Once the posts and shelves are in a compact position with respect to the center columns 12, the strut 60 is re-engaged or locked by again inserting clip 66 of strut 60 in the corresponding aperture 70, as described above.

In each mode, the weight of the shelves and center columns 12 urge the center column downwardly, so that the engaged strut 60 is locked in place to limit the distance that the center column can move. The plurality of apertures 70 along posts 14 allow the strut 60 to be locked or engaged at numerous positions to provide a range of shelf inclinations.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Any reference to an item in the disclosure or to an element in the claim in the singular using the articles "a," "an," "the," or "said" is not to be construed as limiting the item or element to the singular unless expressly so stated.

What is claimed is:

1. A rack comprising:

at least four vertical posts;

first and second opposing center columns, each column located about equidistance between two of the vertical posts;

a plurality of rectangularly-shaped shelves, each shelf having front left and right corners each pivotally mounted to one of the posts and rear left and right corners each pivotally mounted to one of the columns, wherein the rack is moveable between an extended mode having the shelves generally horizontal and a collapsed mode having the columns raised relative to the posts and the shelves generally vertical; and counterbalance means attached to at least one of said center columns for at least partially counterbalancing the downward load on said columns, whereby said counterbalance means assists in moving the rack between the extended mode and the collapsed mode.

2. The rack of claim 1 wherein:

the rack is moveable to a display mode in which the front left and right corners of each shelf are lower than the corresponding rear left and right shelf corners; and the strut is moveable to lock the rack in the display mode.

3. The rack of claim 1 wherein each vertical post has a bottom end oriented toward the ground and further comprising four wheels, each wheel rotatably mounted to the bottom end of one of the vertical posts to support the post on the ground.

4. The rack of claim 1 further wherein said counterbalance means comprises:

a spring having a base end and a free end, the base end mounted to one of the columns;

a pulley rotatably mounted to said one column; and a cable threaded around the pulley and having one end attached to one of the posts and the opposite end attached to the free end of the spring, the portion of the cable between the pulley and the spring free end being substantially vertical, wherein the spring provides an upward force on the cable sufficient to at least partially counterbalance the downward load on the columns.

5. The rack of claim 1 further wherein said counterbalance means comprises:

a spring having a base end and a free end with an eyelet, the base end mounted to one of the columns;

first and second pulleys rotatably mounted to said one column; and a cable threaded around the pulleys and through the eyelet, the cable having one end attached to one of the posts and the opposite end attached to another of the posts, the portions of the cable between the pulleys and the eyelet being substantially vertical, wherein the spring provides an upward force on the cable sufficient to at least partially counterbalance the downward load on the columns when the shelves are empty.

6. The rack of claim 3 wherein at least one end of the strut is pivotally and fixedly mounted and the opposite end is detachably mounted.

7. The rack of claim 3 wherein the shelves are removably mounted at a plurality of preselected height positions.

8. The rack of claim 7 wherein:

a stud extends from each corner of the shelves; and the columns and posts define a plurality of apertures each adapted to pivotally and removably receive one of the studs.

9. A rack comprising:

at least four vertical posts each having a bottom end oriented toward the ground;

at least four wheels, each wheel rotatably mounted to the bottom end of one of the vertical posts to support the post on the ground;

first and second opposing center columns, each column located about equidistance between two of the vertical posts;

a plurality of rectangularly-shaped shelves, each shelf having front left and right corners each pivotally mounted to one of the posts and rear left and right corners each pivotally mounted to one of the columns, wherein the rack is moveable among an extended mode having the shelves generally horizontal, a display mode in which the front left and right corners of each shelf are lower than the corresponding rear left and right shelf corners, and a collapsed mode having the columns raised relative to the posts and the shelves generally vertical;

at least one strut adjustably mounted to one of the columns and one of the posts, wherein the strut is moveable to lock the rack in the selected extended mode, display mode, or collapsed mode;

a spring having a base end and a free end, the base end mounted to the first column;

a first pulley rotatably mounted to the first column; and a cable having one end attached to one of the posts, the cable being threaded around the pulley and engaged with the free end of the spring to tension the cable, the portion of the cable between the pulley and the spring free end being substantially vertical, wherein the spring provides an upward force on the cable sufficient to at least counterbalance the downward load on the columns when the shelves are empty, the rack is in the extended mode, and the strut is disengaged.

10. The rack of claim 9 further comprising a second pulley rotatably mounted to the first column, wherein:

the spring free end includes an eyelet;

the cable has a second end attached to another of the posts;

the cable is threaded through the eyelet and around the second pulley; and the portions of the cable between the pulleys and the eyelet are substantially vertical.

11. A rack comprising:

at least four vertical posts;

first and second opposing center columns, each column located about equidistance between two of the vertical posts;

a plurality of rectangularly-shaped shelves, each shelf having front left and right corners each pivotally mounted to one of the posts and rear left and right corners each pivotally mounted to one of the columns, wherein the rack is moveable between an extended mode having the shelves generally horizontal and a collapsed mode having the center columns raised relative to the posts and the shelves generally vertical;

locking means attached to at least one vertical post and one center column for securing the rack in at least one of the extended mode and the collapsed mode; and counterbalance means attached to at least one of said center columns sufficient for at least partially counterbalancing the downward load on the columns, whereby said counterbalance means assists in moving the rack to the collapsed mode from the extended mode when the locking means is disengaged.

12. The rack of claim 11 wherein:

the rack is moveable to a display mode in which the front left and right corners of each shelf are lower than the corresponding rear left and right shelf corners; and the locking means is capable of securing the rack in the display mode.

13. The rack of claim 11 wherein each vertical post has a bottom end oriented toward the ground and further comprising four wheels, each wheel rotatably mounted to the bottom end of one of the vertical posts to support the post on the ground.

14. The rack of claim 13 wherein the shelves are removably mounted at a plurality of preselected height positions.

* * * * *